US005832168A

United States Patent [19]

Yenter

[11] Patent Number: 5,832,168

[45] Date of Patent: Nov. 3, 1998

[54] OPTICAL FIBER LIGHT TRANSFER APPARATUS

[75] Inventor: Rex A. Yenter, Lakewood, Colo.

[73] Assignee: Advance Display Technologies, Inc., Denver, Colo.

[21] Appl. No.: 889,467

[22] Filed: Jul. 8, 1997

[51] Int. Cl.[6] .......... G02B 6/08

[52] U.S. Cl. .......... 385/147; 385/116; 385/120; 385/901

[58] Field of Search .......... 385/120, 116, 385/147, 901

[56] References Cited

U.S. PATENT DOCUMENTS

| | | | |
|---|---|---|---|
| 4,650,280 | 3/1987 | Sedlmayr | 350/96 |
| 4,773,730 | 9/1988 | Sedlmayr | 350/96 |
| 4,786,139 | 11/1988 | Sedlmayr | 350/96 |
| 4,929,048 | 5/1990 | Cuypers | 350/96 |
| 5,465,315 | 11/1995 | Sakai et al. | 385/120 |

*Primary Examiner*—John D. Lee
*Assistant Examiner*—Juliana Kang
*Attorney, Agent, or Firm*—Duft, Graziano & Forest, P.C.

[57] ABSTRACT

A light transfer apparatus for transferring an image from a relatively small projection surface to a relatively large display surface. The light transfer apparatus includes modules having a display surface, a light input surface and a connection surface. A plurality of modules are arranged so that their respective display surface combine to form the display screen. The modules are connected to a frame by snapping each module onto a support bar which is connected to the frame. Optical fibers, which terminate on the surface of each module and extend from the light input surface of each module, are positioned in a pigtail frame to form the projection surface. An image projected on the projection surface is viewed in magnified form on the display screen. The modular assembly design allows individual modules to be removed and replaced in the display screen without affecting any modules in addition to the replaced module.

13 Claims, 9 Drawing Sheets

OPTICAL FIBER LIGHT TRANSFER APPARATUS

FIELD OF THE INVENTION

The invention relates to the field of optical fiber light transfer apparatus and a display screen system utilizing multiple optical fiber light transfer modules.

PROBLEM

There is a well-known need for the display of graphic or video information to large numbers of people in relatively large indoor or outdoor settings. Examples of such large-scale display applications include schedule information to travelers in train stations or airports, betting information to bettors in casinos and instant replay display in indoor or outdoor stadiums and arenas. Although smaller in scale, residential television applications now are such that conventional cathode ray tube technology is not appropriate or even possible for some applications.

There are many existing optical fiber-based large scale display systems based on a modular design. These existing systems make use of a relatively small display module. Multiple such modules are arrayed to form a display screen. Existing such systems are complicated in design and difficult and expensive to manufacture rendering them economically prohibitive for widespread commercial use.

A further problem of existing modular display systems is that the image displayed on the display screen can appear segmented both vertically and horizontally. This is because the overall display is formed, as noted above, from multiple modules. This effect is sometimes referred to as the "shingle effect". The interfaces between each module appear as distinct lines. This occurs for a variety of reasons. Physical mismatching between the edge of a module with respect to the adjacent edges of the neighboring modules is visible as distinct lines on the display surface. In fact, the human eye is quite adept at discerning such incongruities in a display screen surface and resolving such incongruities as lines on the display surface. Another source of discontinuities in the display screen surface is that multiple rows of modules may not perfectly align pixel for pixel with adjacent rows of modules. Any horizontal variation in position between the pixels of one module with respect to a module located above or below the first module is again resolved by the human eye as a discontinuity in the display screen surface.

U.S. Pat. No. 4,650,280 (the '280 patent) issued to Sedlmayr on Mar. 17, 1987 describes a modular fiber optic light transfer module. A ribbon of optical fibers are fixed in a plastic spacer. Multiple spacers are stacked to produce a module having rows of optical fibers which terminate on a viewing surface of the display module. The other ends of the optical fibers are gathered into relatively small array onto which is projected an image. The image is transferred through the optical fibers to the relatively large surface of the display screen. The '280 patent does not provide a high pixel contrast ratio since the optical fibers are aligned in a ribbon format. Therefore there is no space between individual pixels. Also, the '280 patent does not provide an apparatus for fixing multiple such modules in a fixed, adjacent relationship to develop a large display screen. Also, the '280 patent does not address the issue of eliminating any discontinuities in the displayed image due to inconsistencies between the multiple modules.

U.S. Pat. No. 4,773,730 (the '730 patent) issued to Sedlmayr on Sep. 27, 1988 describes an apparatus for connecting a plurality of fiber optic light transfer modules to form a display screen. The system of the '730 patent includes a complicated arrangement of uniquely shaped modules arranged to cooperate with metal rods. The metal rods operate to connect adjacent modules into rows of modules. The system, although effective to physically connect modules together and to a frame, is complex and expensive. There is no efficient way to remove a single module from the display screen without dismantling the entire display. There also is no way to carefully align rows of modules to help eliminate pixel offset between adjacent rows.

U.S. Pat. No. 4,786,139 (the '139 patent) issued to Sedlmayr on Nov. 22, 1988 also teaches an apparatus for arranging multiple light transfer modules in a display screen array. The system of the '139 patent is also complex and expensive to produce. The system allows little flexibility in alignment of modules or removal or replacement of modules.

There exists a need for optical fiber light transfer display screen system that is relatively simple to construct from a plurality of optical fiber light transfer modules. There also exists a need to flexibly adjust the pixel offset between rows of the display screen system. There exists an additional need for a display screen system that provides for relatively seamless alignment between adjacent light transfer modules.

SOLUTION

The above-described problems and others are solved and an advance in the art is thereby achieved by the display screen system of the present invention. The display screen system of the present invention provides a simple, rugged and flexible apparatus and method for arranging multiple light transfer modules into a display screen. Rows of light transfer modules are individually adjustable to eliminate pixel offset between rows. The light transfer modules themselves are designed to provide a relatively seamless alignment between light transfer modules thus exhibiting little or no shingle effect. The result is a large-scale display screen having unprecedented ease of assembly, flexibility of adjustment and continuity of the displayed image.

The system of the present invention is comprised, in part, by a frame on which the light transfer modules are mounted. Each light transfer module is formed to snap into place on a mounting bar that extends across the width of the frame. There is one such mounting bar for each row of light transfer modules which comprise the display screen. Each row of light transfer modules is horizontally adjustable by the manipulation of adjustment blocks secured to the frame at each end of each row of light transfer modules. The rows of light transfer modules are adjusted using the adjustment blocks to eliminate any offset in the pixel alignment from one row to the next. Once aligned, each individual light transfer module is securely mounted to the mounting bar with a mounting bracket.

Each light transfer module seamlessly aligns with vertically adjacent light transfer modules through cooperating vertical mating surfaces on the top and bottom of each light transfer module. The result is the reduction or elimination of any visible line or discontinuity between vertically adjoining light transfer modules.

Individual light transfer modules are not connected to other light transfer modules. This allows the removal, insertion or replacement of single light transfer modules to and from a complete display screen system without the need to dismantle the entire system.

The system of the present invention provides a simple, efficient and flexible large scale display screen system.

Although most of the detailed description is made with respect to a display screen system where light is projected from a video projector of some type, the invention is also useful in other applications. For example, one might mate the ends of the optical fibers to Light Emitting Diode ("LED") arrays which are stimulated by a video processing system to emit appropriately colored light directly into one end of the optical fibers for display on the display screen surface.

Other salient features, objects, and advantages will be apparent to those skilled in the art upon a reading of the discussion below in combination with the accompanying drawings.

DETAILED DESCRIPTION

Figure 1:
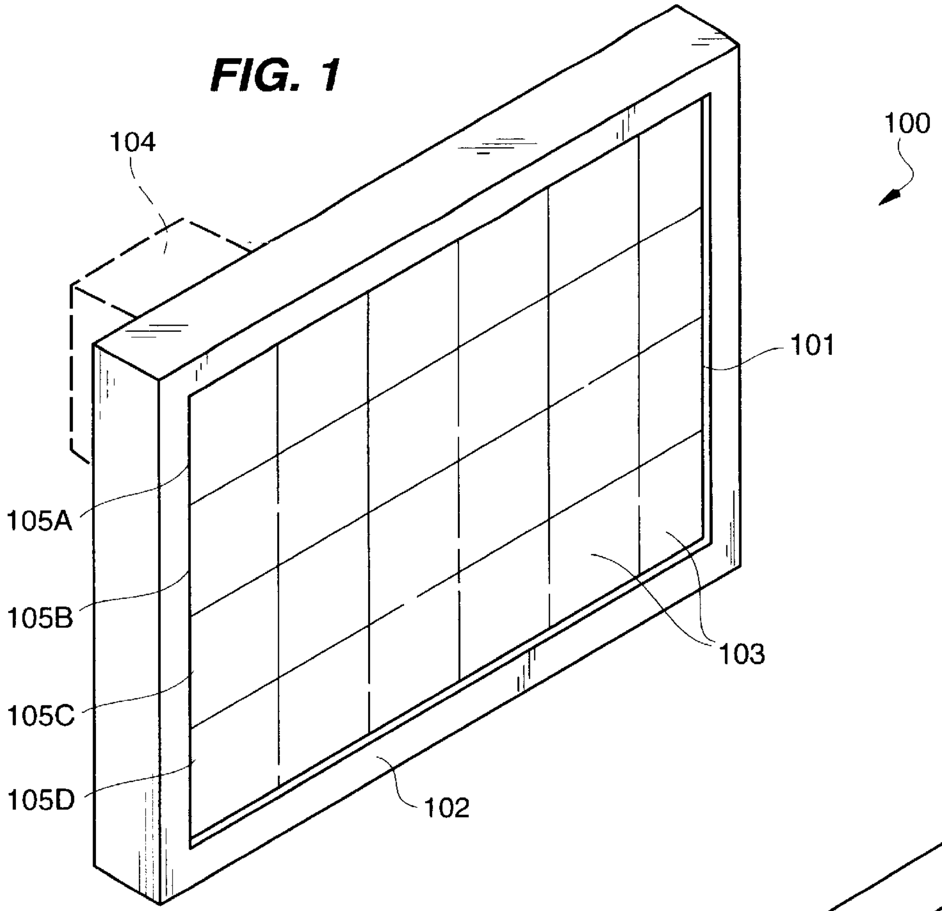
FIG. 1 is a front perspective view of a complete modular display screen system according to the present invention.
Figure 2:
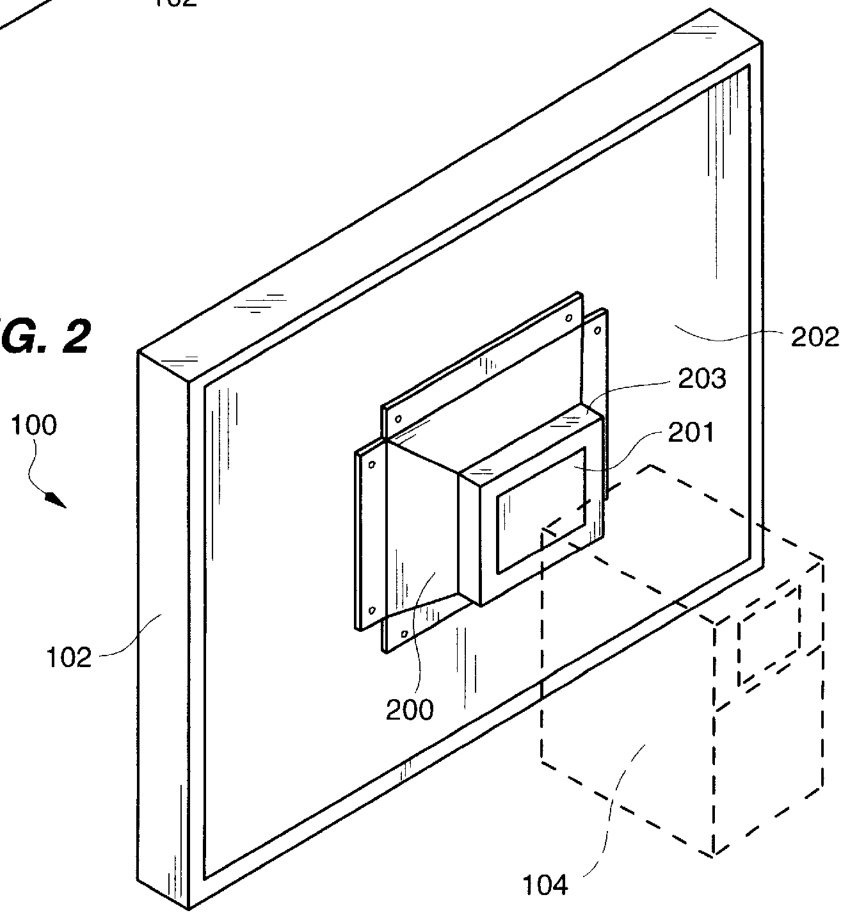
FIG. 2 is a rear perspective view of a complete modular display screen system according to the present invention.

Display Screen System in General—FIGS. 1–2

FIGS. 1–2 generally illustrate a complete display screen system 100 according to the present invention. For all of FIGS. 1–10, elements visible in one FIG. that are common to another FIG. are referenced by common reference numerals in all FIGS. Display screen system 100 is comprised of display screen 101 surrounded by frame cover 102. Display screen 101 is comprised of a plurality of light transfer modules 103 arranged in columns and rows. The size of each light transfer module 103 is of course variable to meet design requirements. In a preferred embodiment of the present invention each light transfer module 103 is 6"×6". These dimensions for light transfer module 103 provide a display screen size, for the example of FIGS. 1–2 of 3' wide by 2' tall. As apparent to those skilled in the art, the size of the display screen of the present invention is scalable to any desired size.

A plurality of optical fibers (not shown in FIGS. 1–2) are arranged in each light transfer module. One end of each optical fiber terminates on display screen 101 and the other end of each optical fiber terminates on projection surface 201. One end of each fiber in every light transfer module of display system 100 terminates at projection surface 201. The fibers at projection surface 201 are arranged in an array to maintain the same relative relationship held by the other end of the optical fibers terminated on display screen 101. For example, an optical fiber terminating at one end in the upper right-most corner of display screen 101 terminates at its other end in the upper right-most corner of projection surface 201.

Light projector 104 projects an image onto projection surface 201. The projected image is transferred by the transmission of light through the optical fibers. The projected light is emitted at display screen 101 from the ends of the optical fibers terminating at the display screen. Optical fiber guide 200 serves to guide the optical fibers to the projection surface 201 and pigtail frame 203, described in more detail with respect to FIG. 11, operates to hold the optical fibers in the proper orientation at the projection surface 201.

Light projector 104 is any kind of light projection device delivering light of sufficient intensity that the light is transmitted to display screen 101 and is visible to the viewer.

Figure 3:
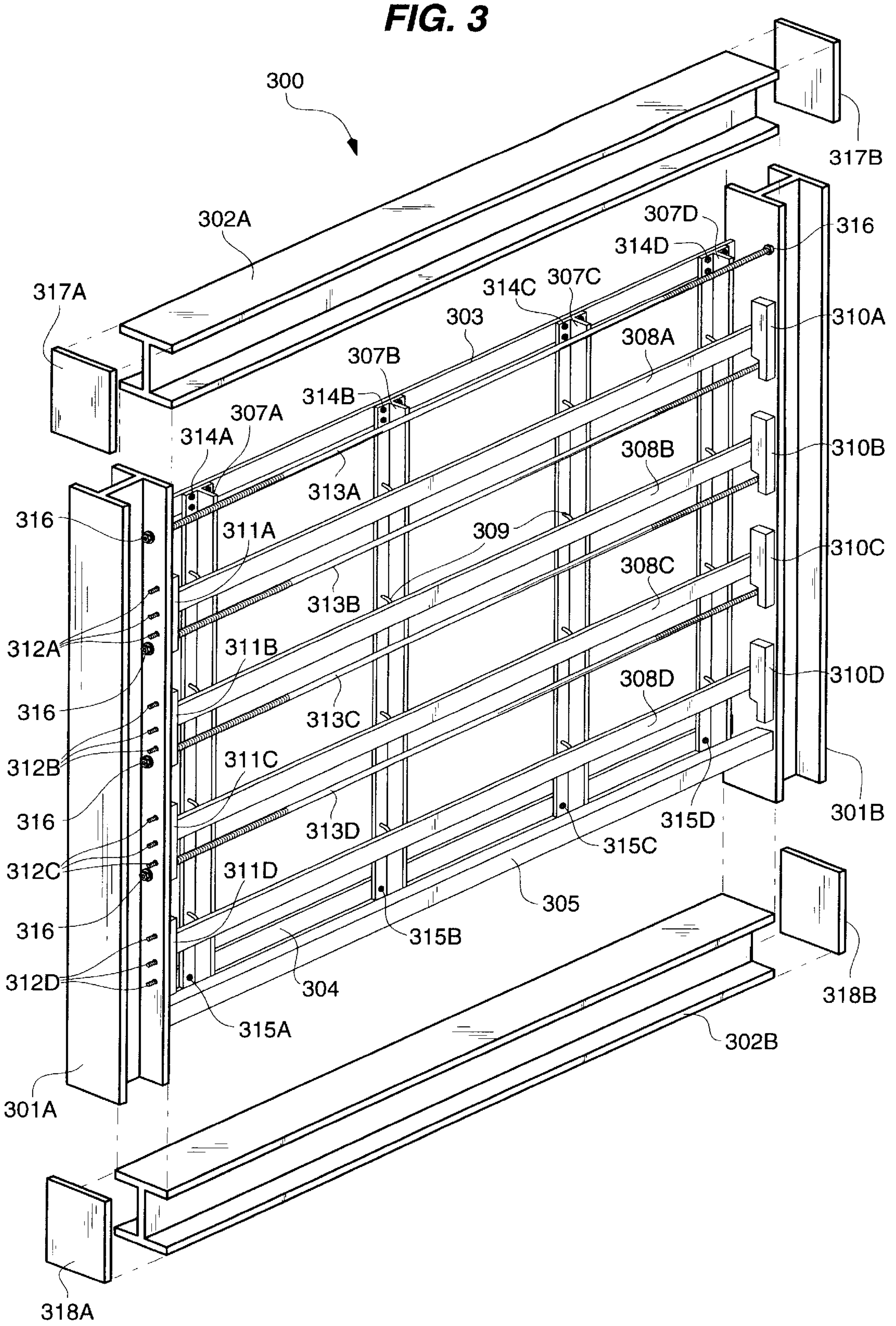
FIG. 3 is a front perspective view of a frame assembly for a display screen system according to the present invention.
Figure 4:
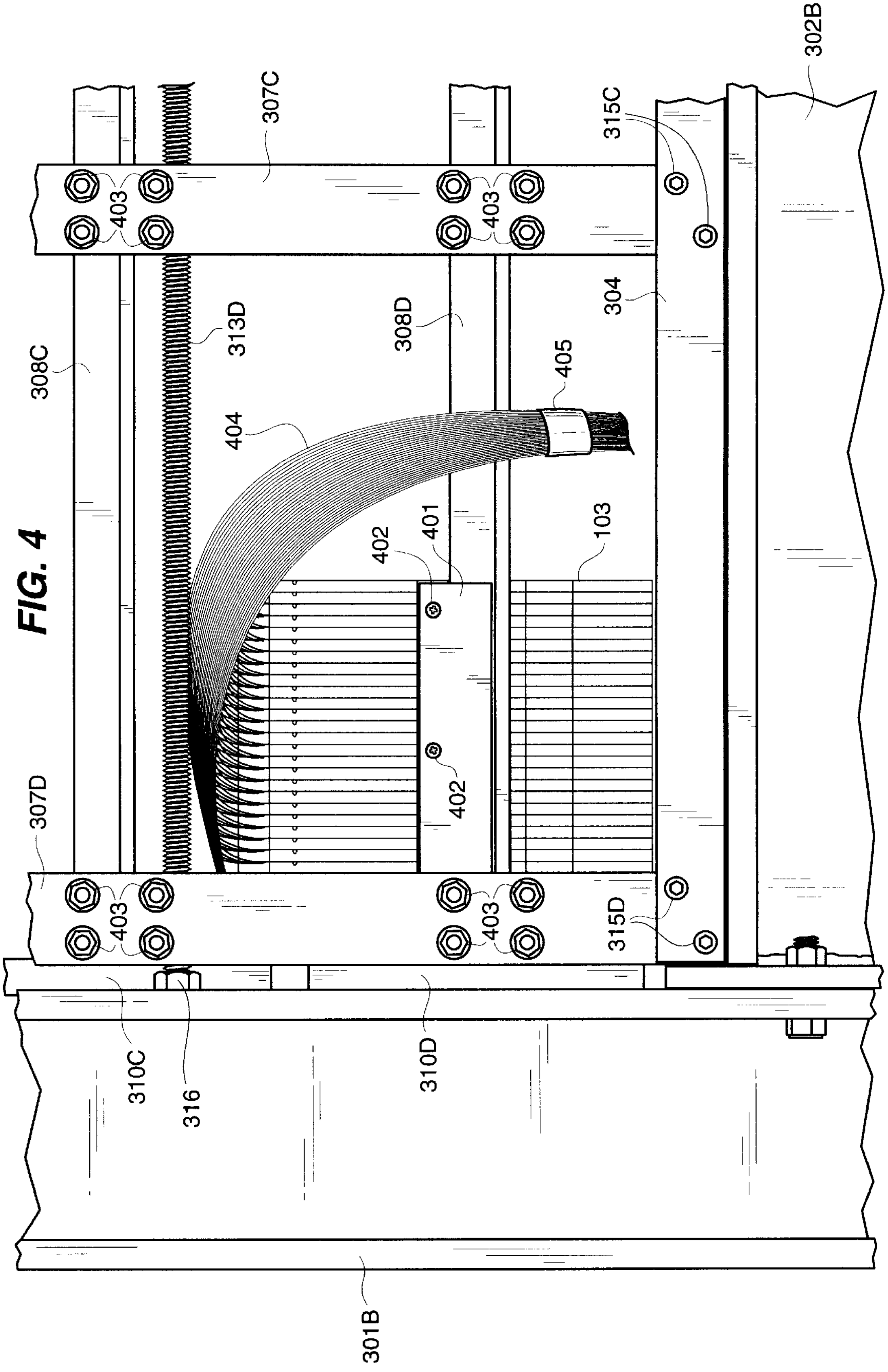
FIG. 4 is a rear view of a portion of the frame assembly for a display screen system showing one installed light transfer module.

Display System Frame—FIG. 3–4

FIG. 3 illustrates display screen frame 300. Display screen frame 300 is formed from a border comprised by left I-beam 301A, right I-beam 301B, top I-beam 302A and bottom I-beam 302B. I-beams 301A–301B and 302A–302B are formed from aluminum H-beam to provide a rigid and relatively light structure for display screen frame 300. Top rail 303 and bottom rail 304 are preferably formed from steel bar stock. End-caps 317A-317B are weld to their respective ends of top I-beam 302A. Top I-beam 302A is fixedly attached to side I-beams 301A–301B with bolts (not shown) passing through end-caps 317A-317B and side I-beams 301A–301B. Bottom support 305 is also fixedly connected between side I-beams 301A–301B. Those skilled in the art recognize that screen frame 300 could be comprised of different materials and different shaped materials than those described with respect to the preferred embodiment. Screen frame 300 need only be formed of materials sufficient to support the weight of the display screen without deforming under the forces necessary to assemble the display screen and without degrading over time. Aluminum has been used for many of the frame components in the preferred embodiment because of its advantageous combination of weight and strength.

T-bars 307A–307D are arranged vertically between top rail 303 and bottom rail 304. T-bars 307A–307D are fixedly connected to top rail 303 using bolts 314A–314D and to bottom rail 304 using bolts 315A–315D. Module support bars 308A–308D are arranged horizontally between side I-beams 301A–301B . Module support bars 308A–308D are not fixedly connected to side I-beams 301A–301B. At each location of intersection between one of T-bars 307A–307D and one of module support bars 308A–308D, two U-bolts 309 attached to the T-bar pass through holes (not shown in FIG. 3) on the module support bar. U-bolts 309 secure module support bars 308A–308D to the T-bars 307A–307D. In the view of FIG. 3 only a portion of one of the two U-bolts 309 can be seen at each intersection of T-bars 307A–307D and module support bars 308A–308D. Only two of U-bolts 309 are identified with reference with numerals in FIG. 3 but those skilled in the art recognize the similar use of U-bolts 309 across display screen frame 300.

Figure 10:
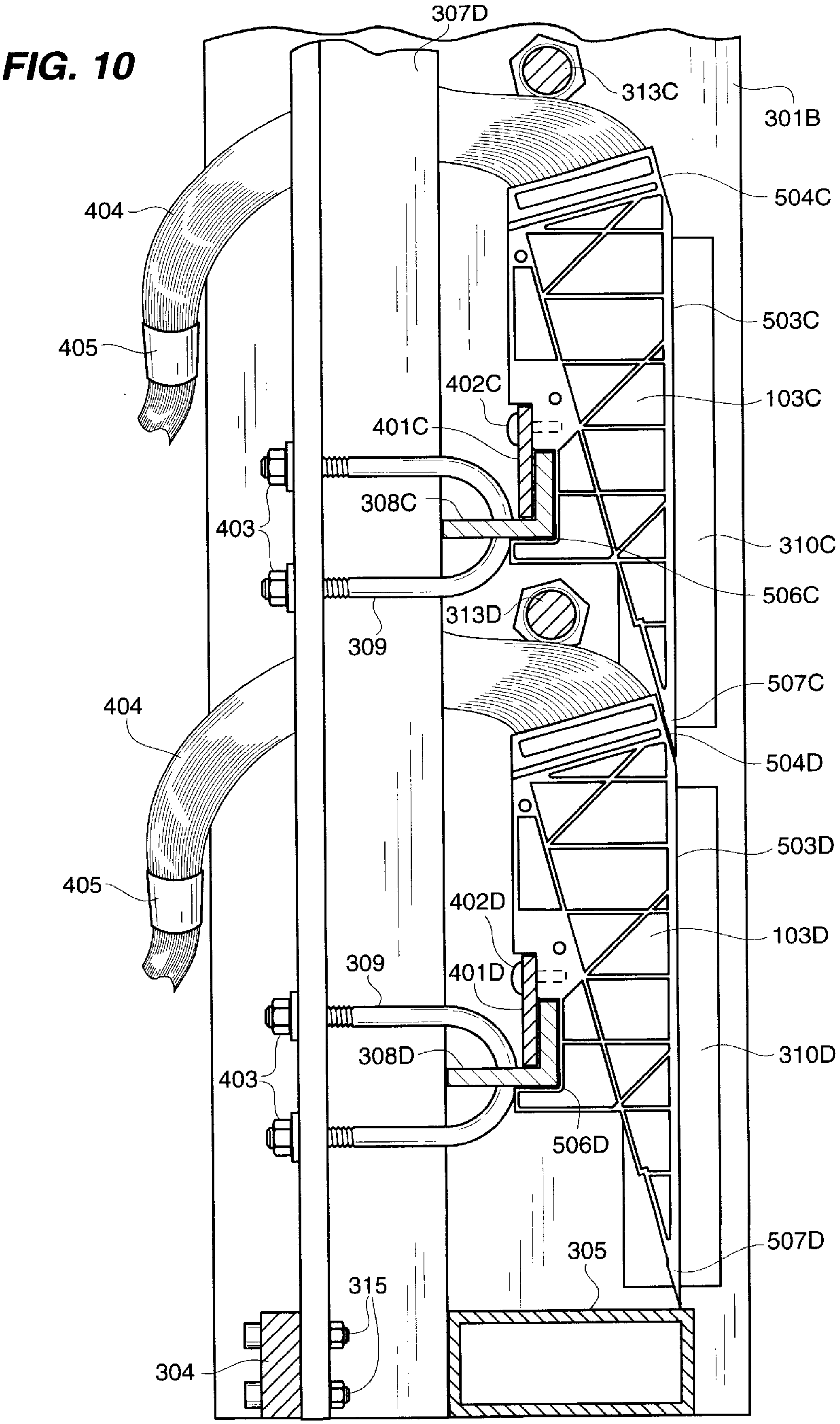
FIG. 10 is side cross-sectional view of two light transfer modules connected to the display screen frame.

As described in more detail with respect to FIGS. 4 and 10, each light transfer module 103 (not shown in FIG. 3) attaches to frame 300 by snapping into place on module support bars 308A–308D. Horizontal adjustment blocks 310A–310D and horizontal adjustment blocks 311A–311D bound each row of light transfer modules. For example, with reference to FIG. 1, row 105A of light transfer modules 103 is bounded on the left side of frame 300 by horizontal adjustment block 311A and on the right side of frame 300 by horizontal adjustment block 310A. The light transfer modules 103 adjacent to horizontal adjustment blocks 310A–310D and 311A–311D are not fixedly attached to the horizontal adjustment block. Horizontal adjustment blocks 310A–310D and 311A–311D exert a force against each row of light transfer modules 103. The position of horizontal adjustment blocks 311A–311D is adjusted using adjustment screws 312A–312D. A similar set of adjustment screws (not visible in FIG. 3) is similarly associated with adjustment blocks 310A–310D. Adjustment screws 312A extend through left I-beam 301A and cooperate with horizontal adjustment block 311A. When adjustment screws 312A are turned clock-wise, horizontal adjustment block 311A is caused to move to the right with respect to FIG. 3. Adjustment screws 312B–312D cooperate to move horizontal adjustment blocks 311B–311D in similar fashion.

The horizontal adjustment of row 105A of display screen 101 is described as exemplary of the horizontal adjustment flexibility of the display screen of the present invention. When all of light transfer modules 103 making up row 105A have been installed on module support bar 308A, horizontal adjustment blocks 310A and 311A are adjusted to firmly press against their respective ends of row 105A. When it is determined upon fully assembling display screen 101 that the pixel elements (discussed below with respect to FIG. 9) of row 105A are misaligned to the left, for example, of the pixel elements of row 105B, then row 105A must be adjusted horizontally. The adjustment screws associated with horizontal adjustment block 310A are turned a number of turns counter-clockwise. This causes horizontal adjustment block 310A to move slightly to the right with respect to FIG. 3. Adjustment screws 312A are then turned a similar number of turns clockwise. This causes horizontal adjustment block 311A to move slightly to the right with respect to FIG. 3. The net result is that row 105A of display screen 101 is moved slightly to the right while rows 105B–105D of display screen 101 remain stationary. One skilled in the art recognizes that each row of light transfer modules 103 can be independently adjusted right or left in display screen 101 without affecting the alignment of the other rows. Those skilled in the art also recognize that there are multiple ways that could be employed to provide the horizontal fine adjustment of display screen rows described above. Also, one could choose to use a similar system to provide vertical fine adjustment rather than horizontal fine adjustment.

Frame support elements 313A-313D extend between side I-beams 301A–301B and are connected to side I-beams 301A–301B with bolts 316. Frame support elements 313A–313D operate to keep side I-beams 301A–301B straight despite the pressure exerted on side I-beams 301A–301B by horizontal adjustment blocks 310A–310D and 311A–311D. The force exerted on side I-beams 301A–301B when horizontal adjustment blocks 310A–310D and 311A–311D are adjusted to provide the proper alignment for rows of light transfer modules 103 tends to cause side I-beams 301A–301B to bow rather than be straight. This force is counteracted and side I-beams 301A–301B are maintained straight because of the frame support elements 313A–313D.

FIG. 4 is a rear view of a portion of display screen frame 300. FIG. 4 illustrates in greater detail, and from the rear, the bottom right corner of display screen 300 as seen from the view of FIG. 3. Also, a single light transfer module 103 is shown connected to frame 300. T-Bars 307C–307D are connected by bolts 315C–315D to bottom rail 304 which is in turn fixedly attached to bottom I-beam 302B. Module support bars 308C and 308D are connected to T-bars 307C–307D with U-bolts 309 (not visible in FIG. 4) and nuts 403. A portion of frame support element 313D is shown connected through nut 316 to side I-beam 301B. Light transfer module 103 is slidably connected to module support bar 308D. Before module bracket 401 is tightened, light transfer module 103 can be moved along module support bar 308D by the adjustment of horizontal adjustment block 310D as described with respect to FIG. 3. Once light transfer module 103 is properly positioned along module support bar 308D, module bracket 401 is tightened using screws 402 to hold light transfer module 103 in place. Screws 402 pass through module bracket 401 and into the rear surface of light transfer module 103. Fiber pigtail 404 from light transfer module 103 is drawn together by tie 405.

Light Transfer Module—FIGS. 5–9

Figure 5:
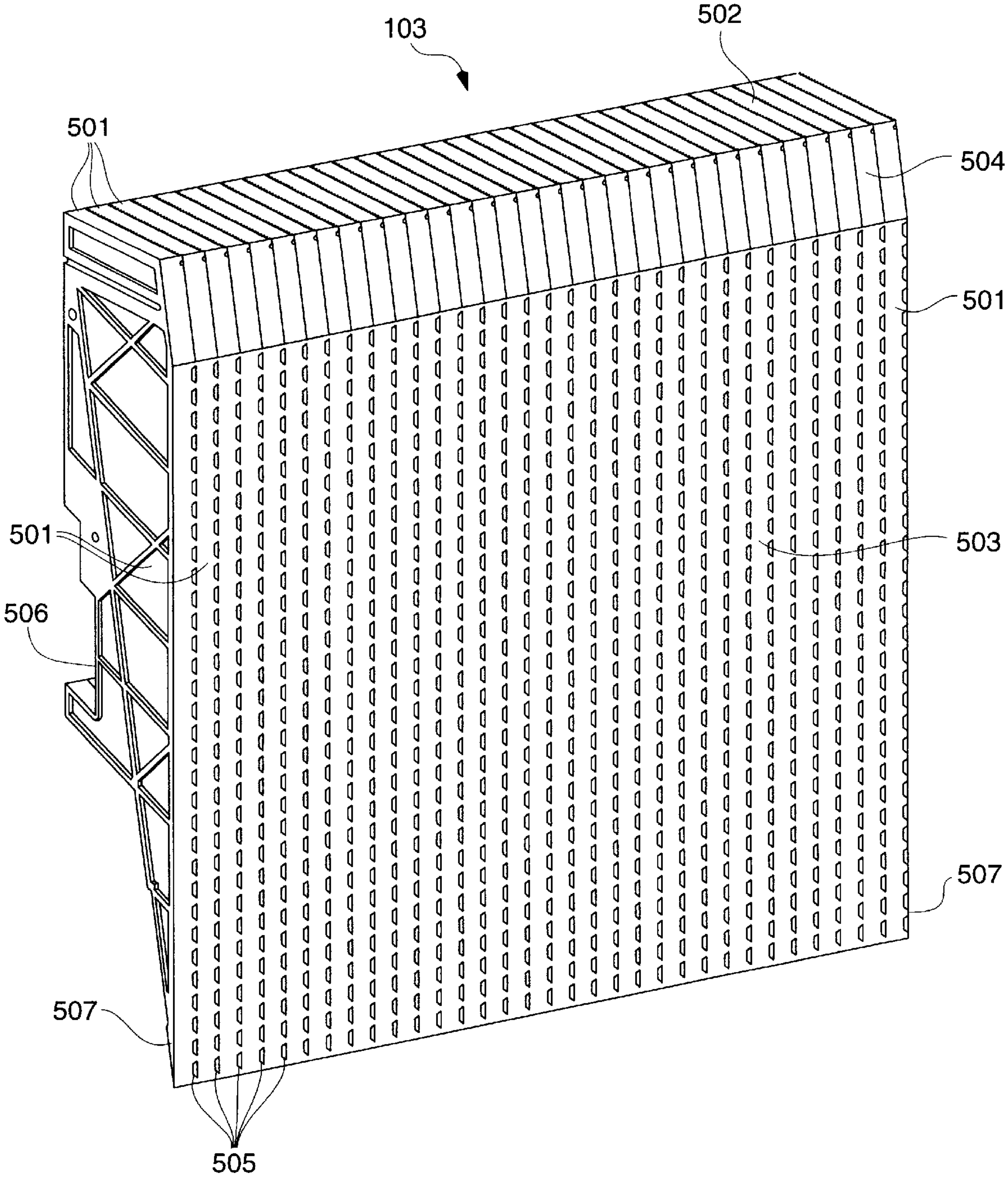
FIG. 5 is a front perspective view of a single light transfer module.

FIG. 5 shows a single light transfer module 103. Each light transfer module 103 is built from multiple half-spacers 501 as described below. Light transfer module 103 has pigtail surface 502, display surface 503 and vertical mating surface 504. The extreme lower portion of light transfer module 103 extending across the full width of light transfer module 103 is mating lip 507. Mating lip 507 is discussed in more detail with respect to FIG. 10. In a preferred embodiment of the present invention, illustrated in FIGS. 5–9, 32 half spacers 501 are combined to form a light transfer module 103. Each half spacer 501 is formed, as described below with respect to FIGS. 7–8, to accept and hold 32 optical fibers (not shown in FIG. 5). This configuration results in 1024 pixels 505 on display surface 503. Each pixel 505 is the termination of one optical fiber on display surface 503.

Channel 506 on the rear surface of light transfer module 103 is formed to mate with one of module support bars 308A–308D. Light transfer module 103 is dimensioned so that the plastic formed light transfer module 103 can with slight pressure be "snapped" into place on one of module support bars 308A–308D. The relationship between channel 506 of light transfer module 103 and module support bars 308A–308D is seen with respect to FIGS. 4 and 10.

Figure 6:
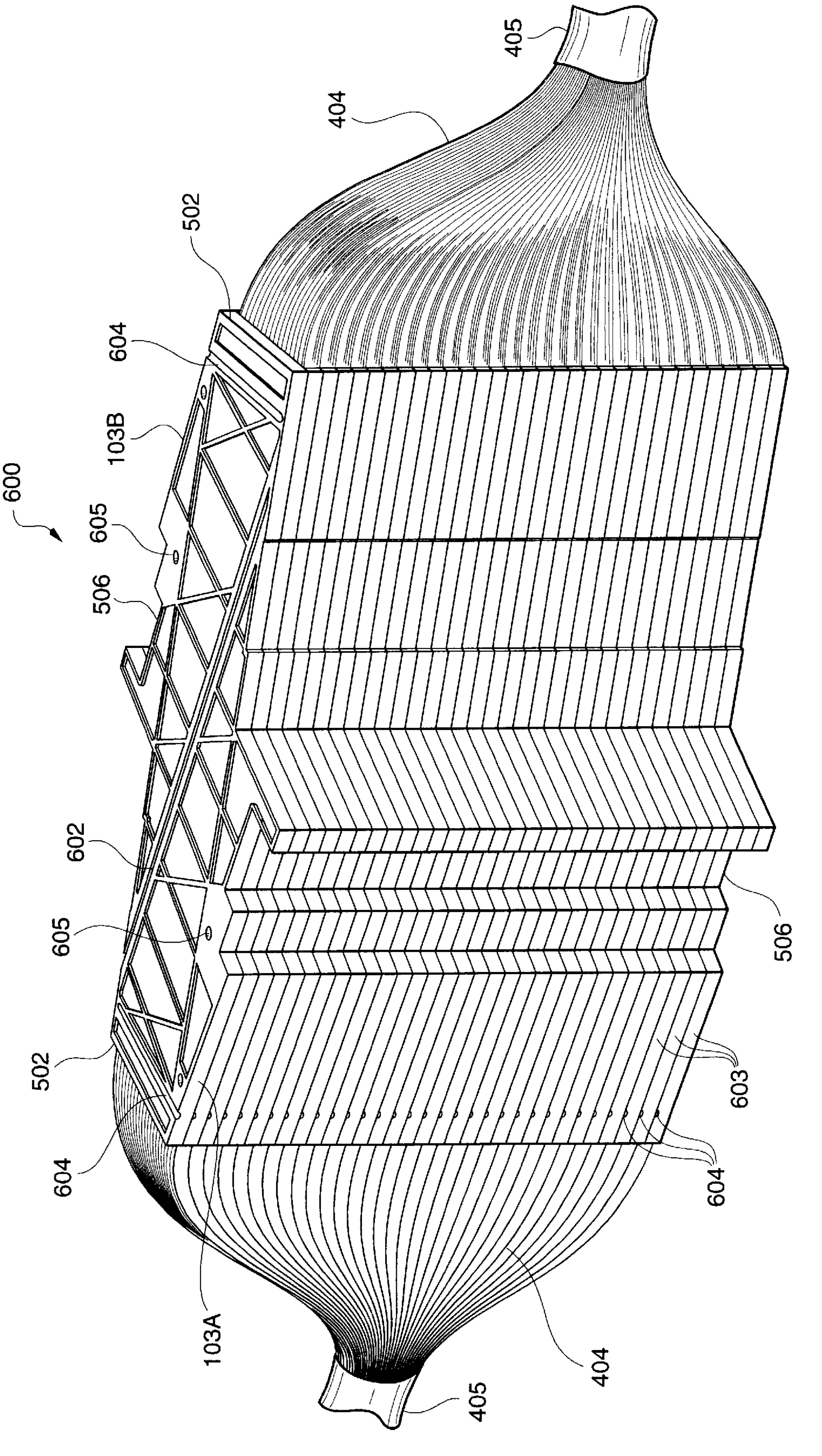
FIG. 6 is a perspective view of a full stack of light transfer module spacers.

FIG. 6 shows a single stack 600 illustrating the method by which light transfer modules 103 are assembled. Stack 600 is comprised of two light transfer modules 103A–103B the separation between which is defined by cut-line 602. Each full spacer 603 is formed to accept strands of optical fiber as discussed in more detail with respect to FIG. 7. In the assembly process, one full spacer 603 is loaded with optical fiber 801. Once loaded, another full spacer 603 is positioned atop the first full spacer 603. The second full spacer 603 is also loaded with optical fiber 801. This process continues until a stack 600 of full spacers 603 is assembled. The strands of optical fiber are gathered together in pigtail 404 by tie 405. In the preferred embodiment, stack 600 is comprised of 32 full spacers. Glue or epoxy is injected into glue ports 604 and 605 and the entire stack is baked resulting in a single, solid structure. An example of a suitable epoxy is Tricon F115. After the Epmar epoxy is injected into glue ports 604–605, the stack 600 is cured at room temperature for 24 hours and baked at 60° C. for an additional 2 hours. A band saw is then used to cut along cut line 602 to separate stack 600 into two light transfer modules 103A and 103B. Then a fly cut is used on each face of each module 103A–103B to provide a consistent finish. In a preferred embodiment of the invention, cut line 602 defines a 15.5° angle across stack 600. Those skilled in the art recognize that any angle stack 600 could be configured to provide any or no angle along cute line 602.

Figure 7:
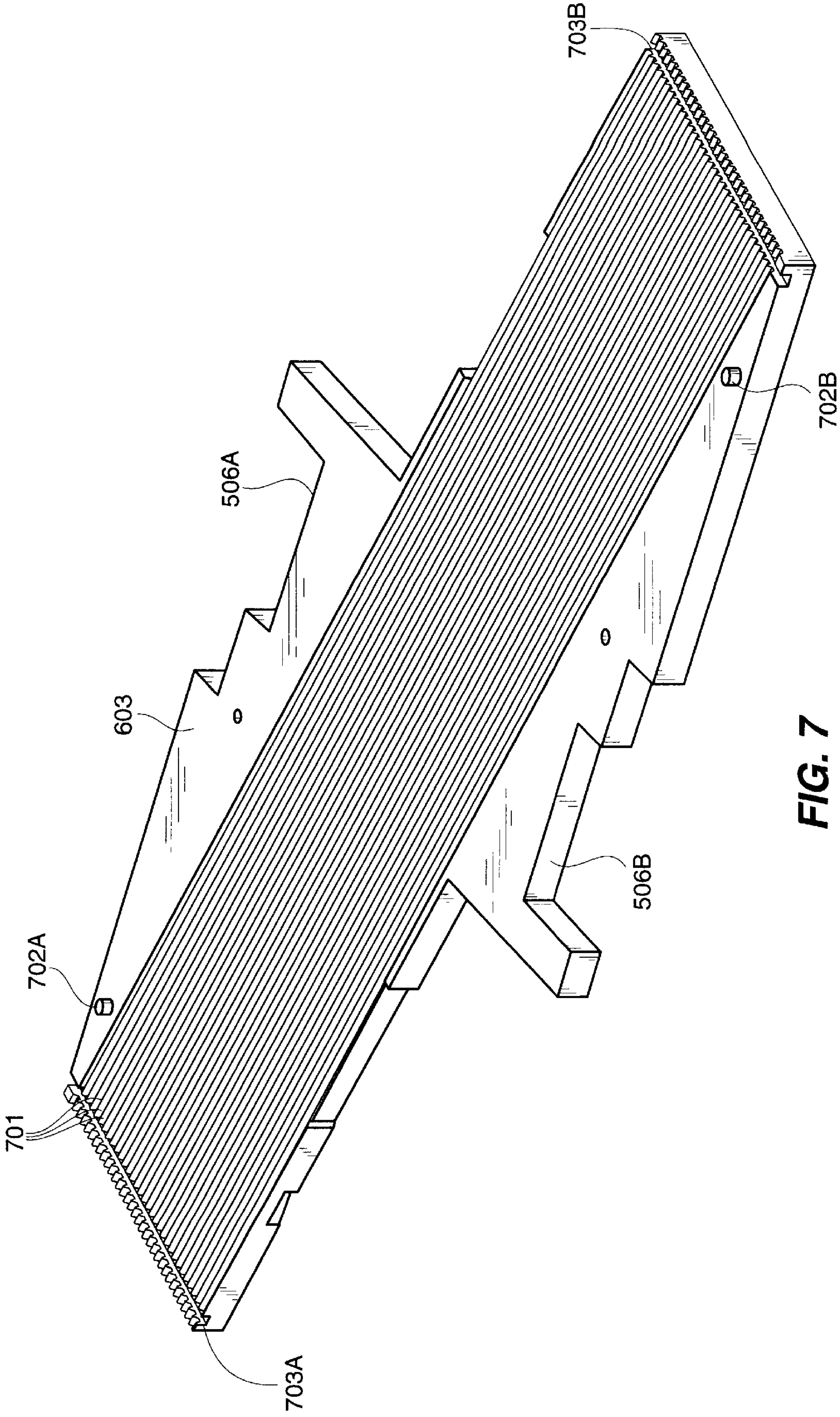
FIG. 7 is a front perspective view of a light transfer module spacer according to the present invention.
Figure 8:
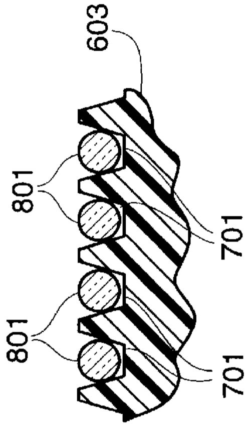
FIG. 8 is a detail showing the optical fiber placed in the light transfer module spacer.

FIG. 7 shows a front view of a single full spacer 603 having channels 506A–506B, one for each light transfer module 103 into which the full spacer 603 is eventually cut. Nipples 702A–702B cooperate with matching cavities on the reverse side of each full spacer 603, discussed with respect to FIG. 9, to align full spacer 603 with respect to other full spacers 603 within the same stack 600. Fiber grooves 701 are formed into the top surface of full spacer 603. With reference to FIG. 8, which is a cross-sectional detail of several fiber grooves 701, one can see the one to one relationship between fiber grooves 701 and optical fiber 801. In a preferred embodiment of the present invention, optical fiber 801 is 0.030" in diameter and fiber grooves 701 are on 0.050" centers. These dimensions provide sufficient spacing such that a satisfactory contrast ratio is achieved on the display surface. Grooves 703A–703B provide an outlet for excess glue injected into glue ports 604–605.

Figure 9:
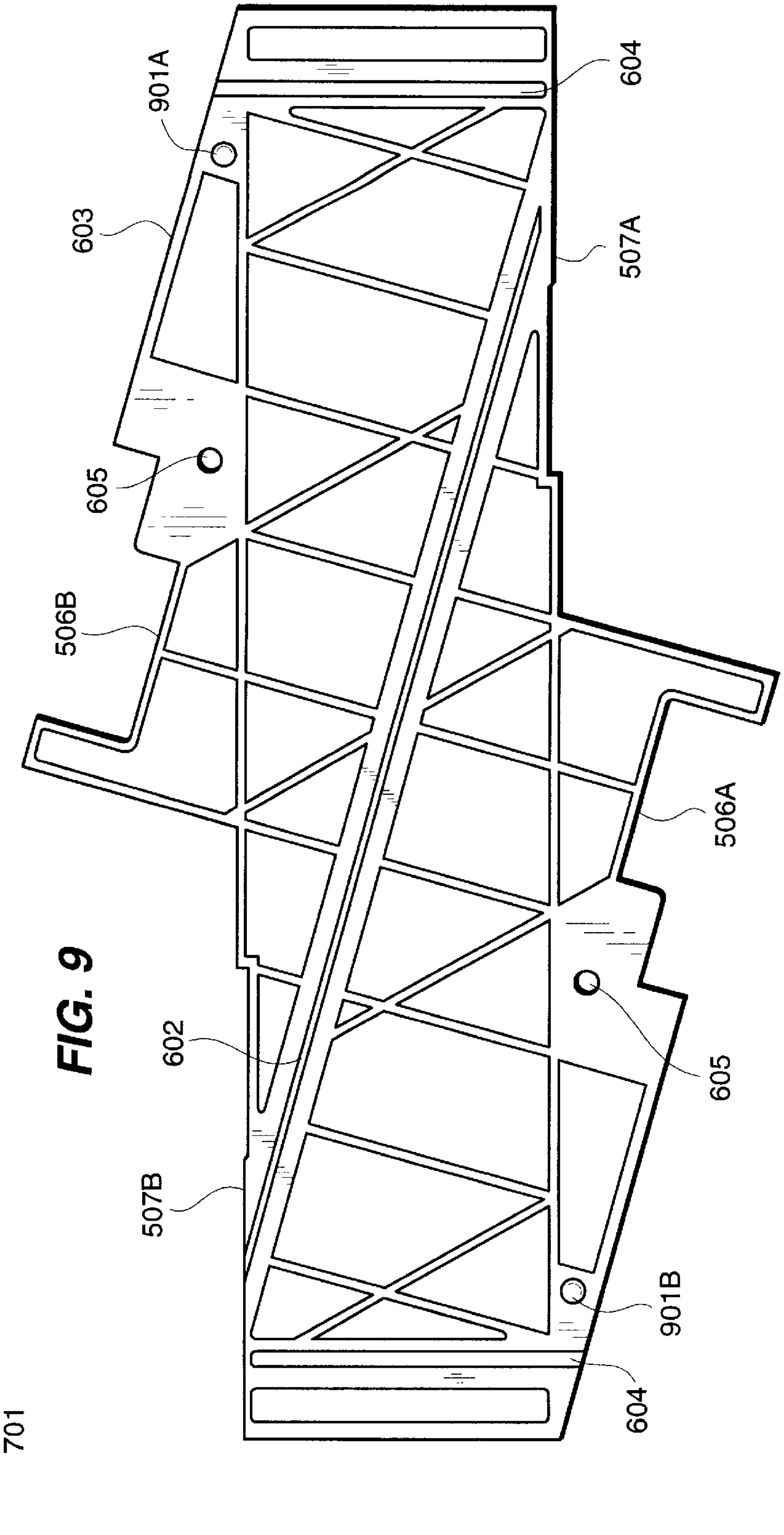
FIG. 9 is a rear view of a light transfer module spacer according to the present invention.

FIG. 9 is a rear view of full spacer 603. Again, channels 506A–506B are visible as is cut line 602. Glue ports 604 and 605 are also visible in FIG. 9. Cavity 901A is positioned to accept a nipple 702A which projects from the front side of an adjacent full spacer 603. Likewise, cavity 901 B is positioned to accept nipple 702B which projects from the front side of an adjacent full spacer 603. The mating of two nipples 702A–702B of each full spacer 603 with two cavities 901A–901B of each full spacer 603 securely aligns the full spacers as they are stacked upon one another during the assembly process.

Display Screen Frame and Light transfer Module Connections—FIG. 10

FIG. 10 is a side cross-sectional view of two light transfer modules 103C–103D connected to the display screen frame. The lower portion of right side I-beam 301B and the adjacent elements are seen in FIG. 10. T-bar 307D connects to bottom rail 304 at the bottom of the display screen. Light transfer module 103D is connected to the display screen frame through module support bar 308D. Module support bar 308D connects to T-bar 307D through U-bolt 309 and nuts 403. Light transfer module 103D snaps onto module support bar 308D which mates with channel 506D on the back-side of light transfer module 103D. Module plate 401D is then screwed into place with screw 402D. Light transfer module 103D is thereby held securely against module support bar 308D. When screw 402D is loosened, light transfer module 103D can slide along module support bar 308D when horizontal adjustment block 310D is adjusted. Light transfer module 103D forms part of the bottom row (row 105D with respect to FIG. 1) of the display screen system. Mating lip 507D, therefore, simply rests against bottom rail 305.

Light transfer module 103C is similarly connected to module support bar 308C using module bracket 401C. Mating lip 507C of light transfer module 103C meshes with mating surface 504D of light transfer module 103D to form a smooth continuous viewing surface with no discontinuities between light transfer module 103C and 103D. Mating surface 504C meshes with a mating lip of a third light transfer module (not shown) positioned above light transfer module 103C. The meshing of the mating lip of one light transfer module with the mating surface of a second light transfer module immediately below the first light transfer module eliminates any discontinuities or shingle effect between light transfer modules.

Figure 11:
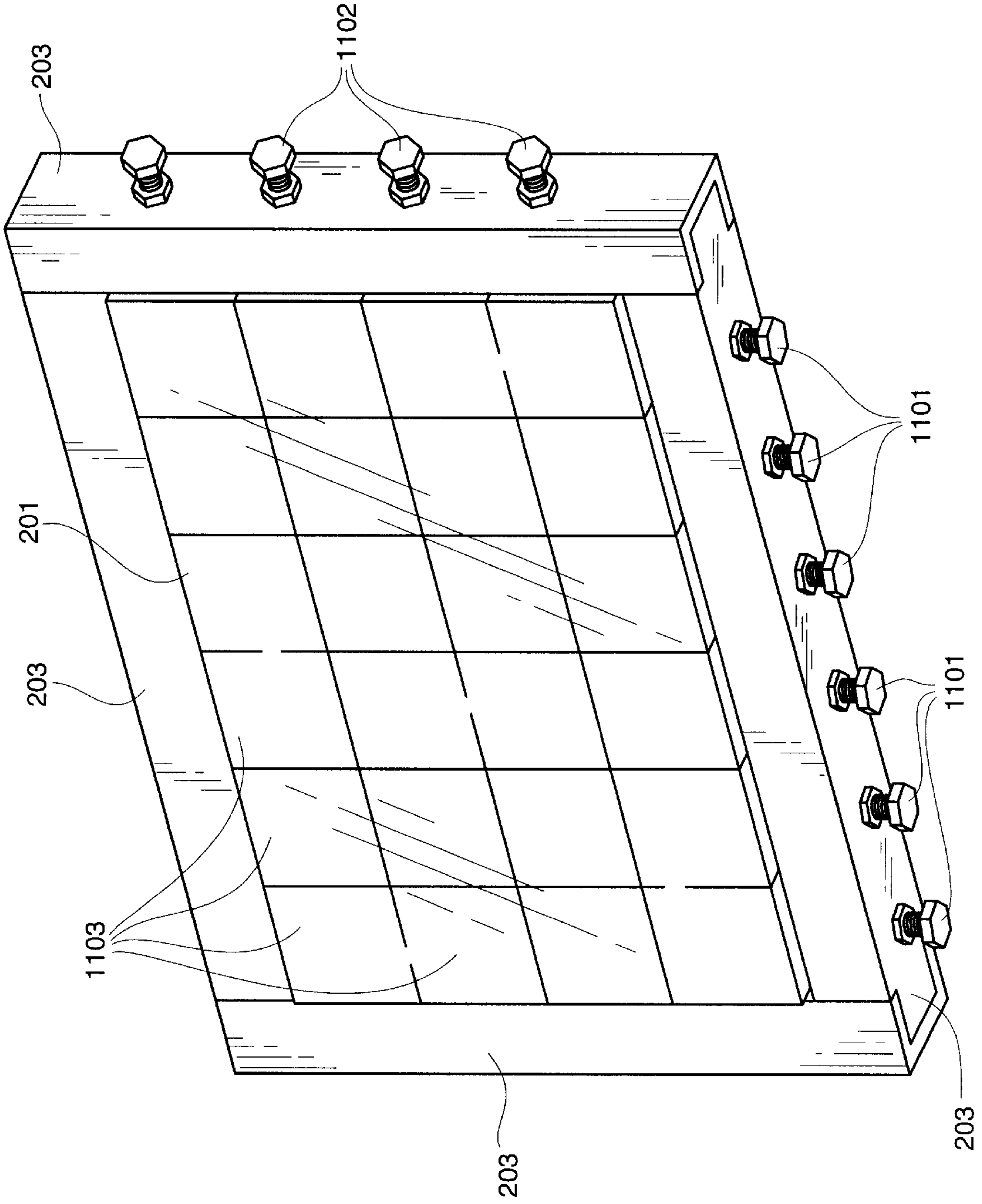
FIG. 11 depicts a pigtail frame for holding the ends of optical fiber pigtails to form a projection surface.

Optical Fiber Guide—FIG. 11 With reference to FIGS. 2 and 11, optical fiber guide 200 includes pigtail frame 203 which operates to maintain the optical fiber pigtails 404 in the proper orientation to form projection surface 201. Projection surface 201 is comprised of the cut-end 1103 of each fiber pigtail 404. Each fiber pigtail 404 is cut to form cut-end 1103 at an angle substantially perpendicular to the longitudinal axis of the optical fiber. Each cut-end 1103 is formed from the optical fiber corresponding to one of light transfer modules 103. Cut-ends 1103 are positioned on projection surface 201 in the same physical relation as their corresponding light transfer module 103. For example, the optical fibers which terminate on a light transfer module 103 at the upper-right-most location of display screen 101 are gathered by a tie 405 into a fiber pigtail 404. The fiber pigtail 404 is cut at an angle substantially perpendicular to the longitudinal axis of the optical fibers to form a cut-end 1103. The particular cut-end 1103 is positioned in the upper-right-most corner of projection surface 201.

The position of the rows and columns of cut-ends 1103 is adjusted using adjustment screws 1102 and 1101, respectively. Adjustment screws 1102 are turned to move individual rows of cut-ends 1103 horizontally so that each row is aligned with its adjacent rows. Adjustment screws 1101 are turned to move individual columns of cut-ends 1103 vertically so that each column is aligned with its adjacent rows.

An individual module 103 can easily be removed and replaced in display system 100 since individual modules are connected only to frame 102 and not to adjacent modules. Also, the fiber pigtail 404 associated with a certain module 103 does not hinder replacement of the module because the cut-end 1103 of the certain fiber pigtail 405 is held only by the force of adjustment screws 110–1102 in pigtail frame 203.

SUMMARY

The display screen system of the present invention provides a simple, rugged and flexible apparatus and method for arranging multiple light transfer modules 103 into a display screen 100. Rows of light transfer modules 103 are individually adjustable along one axis to eliminate pixel offset between rows. The light transfer modules themselves are designed to provide a relatively seamless alignment in another axis between light transfer modules. The display screen 100 according to the present invention thus exhibits little or no shingle effect. The result is a large-scale display screen having unprecedented ease of assembly, flexibility of adjustment and continuity of the displayed image.

Although specific embodiments are disclosed herein, it is expected that persons skilled in the art can and will design alternative header generation systems that are within the scope of the following claims either literally or under the Doctrine of Equivalents.

I claim:

1. A display screen apparatus comprising:

a plurality of modules each having a display surface, a light input surface and a connection surface;

means for conveying light from said light input surface to said display surface;

a frame to which said connection surfaces of said plurality of modules are connected wherein said plurality of modules are positioned on said frame in a two-dimensional array and said display surfaces of said plurality of modules form a single, planar display area; and means for adjusting the position of a first axis of a group of modules with respect to the remaining said plurality of modules wherein said group of modules is a subset of said plurality of modules.

2. The display screen apparatus of claim 1 wherein said means for conveying light comprises:

a plurality of optical fibers arranged with a first end terminated substantially flush with said display surface and a second end extending from said light input surface and arranged to receive light from a light source.

3. The display screen apparatus of claim 2 wherein said light source comprises:

an image projection means for projecting a formed image onto said second ends of said optical fibers.

4. The display screen apparatus of claim 2 wherein said light source comprises:

a plurality of light generators arranged to input light to specific optical fibers.

5. The display screen apparatus of claim 2 wherein said frame means comprises:

a pigtail frame for holding said second ends of said plurality of fibers in a desired relationship to one another; and means for adjusting the relative relationship between said second ends of said plurality of fibers held in said pigtail frame.

6. The display screen apparatus of claim 5 wherein said adjusting means comprises adjustment screws for moving a group of said fibers in an axis with respect to said plurality of fibers.

7. The display screen apparatus of claim 1 wherein said frame comprises:

an outer structure having side beams and top and bottom beams forming a substantially rectangular shape;

module support bars extending between said side beams and having a face formed to mate with said connection surfaces of said plurality of modules;

means for attaching said module support bars to said outer structure; and connection means for securing said modules to said face of said module support bars.

8. The display screen apparatus of claim 7 wherein said means for attaching said module support bars to said outer structure comprises:

T-bars fixedly attached to said top and bottom beams; and

T-bar attachment means for attaching said module support bars to said T-bars near the points of intersection between said T-bars and said module support bars, said T-bars and said module support bars substantially forming a grid within said outer structure.

9. The display screen apparatus of claim 7 wherein said connection means for securing said modules comprises a plate fixedly connected to each said connection surface and arranged to slidably connect to one of said module support bars wherein each of said plurality of modules is slidably mounted to one of said module support bars by one said plate.

10. The display screen apparatus of claim 9 wherein said group of modules is a complete row of modules extending from a first side beam to a second side beam of said frame.

11. The display screen apparatus of claim 10 wherein said means for adjusting the position in a first axis of a group of modules comprises:

a first block means adjustably attached to said first side beam at a position adjacent to a first end of said row of modules and adjustably positioned to move in said first axis;

a second block means adjustably attached to said second side beam at a position adjacent to a second end of said row of modules and adjustably positioned to move in said first axis; and said first block means and said second block means are adjustable to align the position of said row of modules in said first axis.

12. The display screen apparatus of claim 11 wherein said first and second block means comprise:

a row end block for applying pressure to said row of modules at one end of said row of modules; and a threaded element passing through one of said side beams and connected to said row end block and operable to move said row end block along said first axis when said threaded element is turned.

13. The display screen apparatus of claim 1 wherein each of said plurality of modules comprises:

a beveled mating surface along a top edge of said display surface; and a honed bottom edge of said display surface formed such that said honed bottom edge of a first module complements a second module positioned below said first module by overlapping said beveled mating surface of said second module to produce said planar display area formed from said first and second modules.

* * * * *